(12) United States Patent
Kojima et al.

(10) Patent No.: US 12,433,570 B2
(45) Date of Patent: Oct. 7, 2025

(54) ULTRASOUND PROBE

(71) Applicant: SEIKO EPSON CORPORATION, Tokyo (JP)

(72) Inventors: Chikara Kojima, Matsumoto (JP); Keita Kubo, Matsumoto (JP); Hikaru Iwai, Matsukawa (JP); Eiji Osawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/619,663

(22) Filed: Mar. 28, 2024

(65) Prior Publication Data

US 2024/0324991 A1    Oct. 3, 2024

(30) Foreign Application Priority Data

Mar. 29, 2023  (JP) ................. 2023-052916

(51) Int. Cl.
*A61B 8/00* (2006.01)

(52) U.S. Cl.
CPC .......... *A61B 8/4444* (2013.01); *A61B 8/4422* (2013.01)

(58) Field of Classification Search
CPC ..................... A61B 8/4444; A61B 8/4422
See application file for complete search history.

(56) References Cited

U.S. PATENT DOCUMENTS

| 2012/0266677 | A1* | 10/2012 | Mueller | G01F 23/296 73/632 |
| 2016/0329482 | A1* | 11/2016 | Nakamura | H10N 30/88 |
| 2019/0127217 | A1* | 5/2019 | Cargill | H04R 19/04 |

FOREIGN PATENT DOCUMENTS

JP    2016-092509 A    5/2016

* cited by examiner

*Primary Examiner* — Chao Sheng
(74) *Attorney, Agent, or Firm* — Harness, Dickey & Pierce, P.L.C.

(57) ABSTRACT

An ultrasound probe includes: an ultrasound device configured to perform at least one of transmission and reception of an ultrasound wave; and a case housing the ultrasound device. The ultrasound device includes a vibration plate and a piezoelectric element disposed at the vibration plate. The case is provided with an opening facing the vibration plate, and a first communication hole that is provided at a position different from a position of the opening and that communicates an internal space of the case with outside of the case. The case includes a sealing mechanism configured to prevent entry of a water droplet from the opening into the internal space.

6 Claims, 8 Drawing Sheets

ULTRASOUND PROBE

The present application is based on, and claims priority from JP Application Serial Number 2023-052916, filed Mar. 29, 2023, the disclosure of which is hereby incorporated by reference herein in its entirety.

BACKGROUND

1. Technical Field

The present disclosure relates to an ultrasound probe.

2. Related Art

In the related art, an ultrasound probe that transmits ultrasound waves to a living body is known (for example, see JP-A-2016-92509). In the ultrasound probe in JP-A-2016-92509, an ultrasound device and a wiring board are disposed in a case. The case includes a window hole where an acoustic lens is disposed, and the ultrasound device is disposed in the case while facing the acoustic lens. A first waterproof layer (lens-side waterproof portion) is provided between the window hole and the acoustic lens. Further, the case includes a first case where the window hole is provided, and a second case that sandwiches the ultrasound device and the wiring board together with the first case. A second waterproof layer (inter-case waterproof portion) is provided between the first case and the second case. Accordingly, it is possible to prevent entry of water droplets such as gel into the case of the ultrasound probe.

JP-A-2016-92509 is an example of the related art.

The ultrasound probe disclosed in JP-A-2016-92509 can prevent entry of the water droplets into the case, and can prevent failure of the ultrasound device due to the water droplets. However, the ultrasound probe may be used by a plurality of patients at a medical site or the like. In this case, it is necessary to perform a sterilizing process on the used ultrasound probe. Normally, a sterilizing apparatus is used for the sterilizing process. In the sterilizing apparatus, the ultrasound probe is put into a sterilizing chamber, then inside of the chamber is depressurized to become a vacuum, and sterilization is performed by filling with a sterilizing gas. Therefore, as in JP-A-2016-92509 described above, in the ultrasound probe in which inside and outside of the case are sealed by the first waterproof layer and the second waterproof layer, when the depressurization is performed in the sterilizing chamber, the ultrasound probe may be damaged due to an atmospheric pressure difference between the inside and the outside of the case.

SUMMARY

An ultrasound probe according to an aspect of the present disclosure includes: an ultrasound device configured to perform at least one of transmission and reception of an ultrasound wave; and a case housing the ultrasound device. The ultrasound device includes a vibration plate and a piezoelectric element disposed at the vibration plate. The case is provided with an opening facing the vibration plate, and a first communication hole that is provided at a position different from a position of the opening and that communicates an internal space of the case with outside of the case. The case includes a sealing mechanism configured to prevent entry of a water droplet from the opening into the internal space.

DESCRIPTION OF EMBODIMENTS

An ultrasound probe according to an embodiment will be described below.

Figure 1:
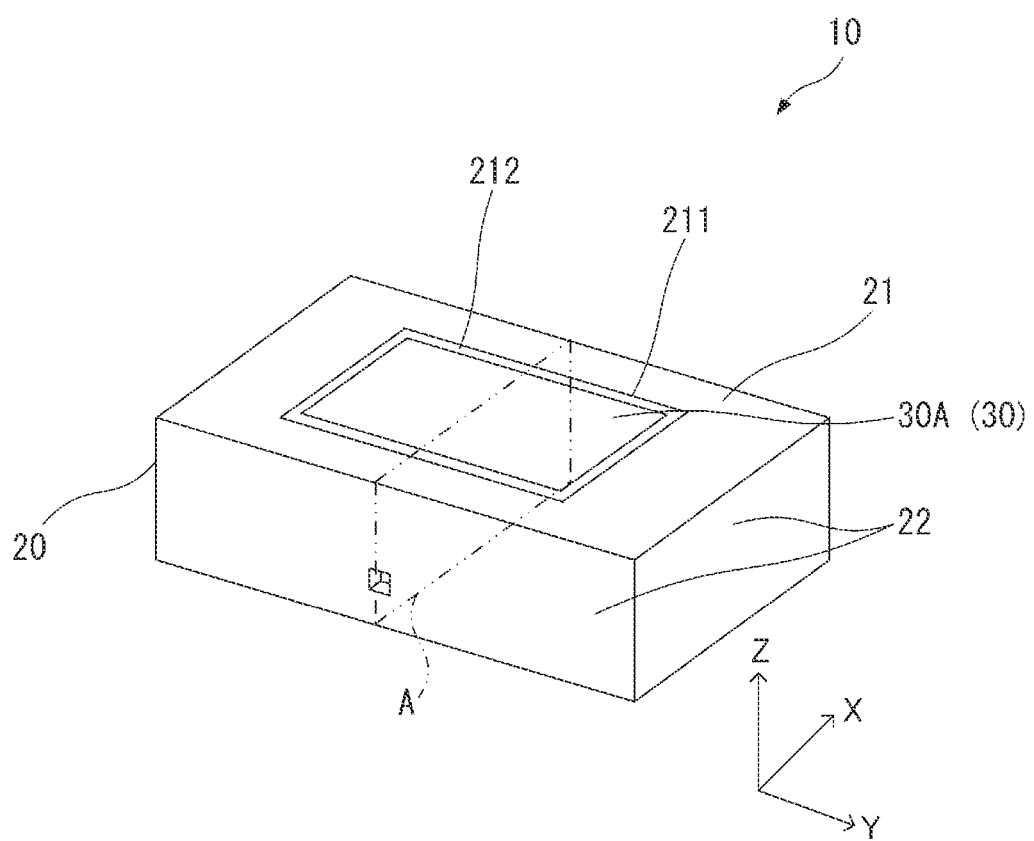
FIG. 1 is a perspective view showing a schematic configuration of an ultrasound probe according to an embodiment.

FIG. 1 is a perspective view showing a schematic configuration of an ultrasound probe 10 according to the embodiment.

The ultrasound probe 10 according to the embodiment is a probe mounted on an object by using a fixing member such as a fixing sheet. In the embodiment, a living body (human body) is exemplified as the object.

The ultrasound probe 10 either transmits or receives ultrasound waves to or from the living body. For example, the ultrasound probe 10 transmits the ultrasound waves to the living body, and receives the ultrasound waves reflected inside the living body, thereby forming an internal tomographic image of the living body. Further, the ultrasound probe 10 may only transmit the ultrasound waves or only receive the ultrasound waves. When the ultrasound probe 10 is used as an ultrasound wave transmission probe, ultrasound treatment in which the ultrasound waves are focused on an organ at a predetermined depth can be exemplified. Further, when the ultrasound probe 10 is used as an ultrasound wave reception probe, a fact that the ultrasound probe 10 receives the ultrasound waves transmitted to inside of the object by a separately provided ultrasound wave transmission probe can be exemplified.

Figure 2:
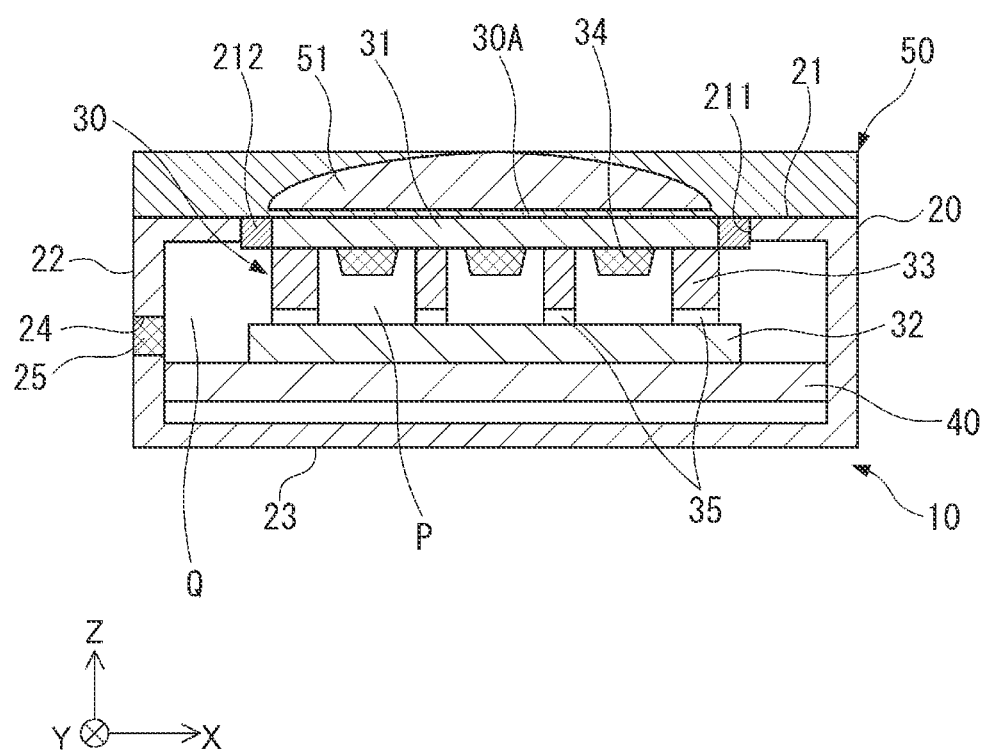
FIG. 2 is a schematic cross-sectional view of the ultrasound probe in FIG. 1 taken along a plane A.

FIG. 2 is a schematic cross-sectional view of the ultrasound probe 10 in FIG. 1 taken along a plane A.

As shown in FIGS. 1 and 2, the ultrasound probe 10 according to the embodiment includes a case 20, an ultrasound device 30 and a control board 40 (see FIG. 2) housed in the case 20, and the like.

In the embodiment, when ultrasound diagnosis is performed on the living body by the ultrasound probe 10, as shown in FIG. 2, a probe sheet 50 including an acoustic lens 51 is stuck to a front surface portion 21 of the case 20 of the ultrasound probe 10. The probe sheet 50 is a sheet that comes into contact with a surface of the living body, and for example, is discarded and replaced for each use.

Configuration of Ultrasound Device 30

First, the ultrasound device 30 that constitutes the ultrasound probe 10 will be described.

Figure 3:
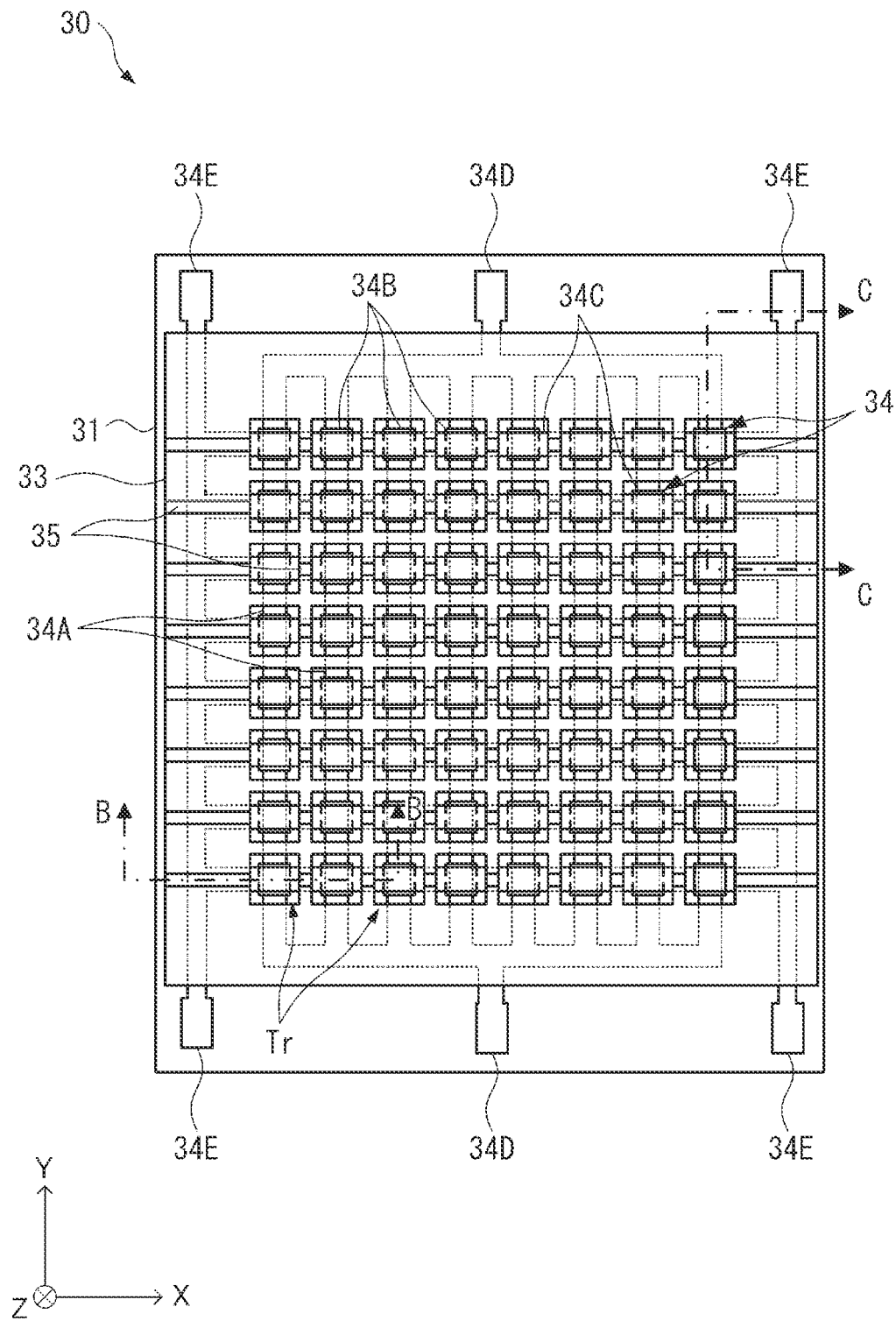
FIG. 3 is a plan view showing an example of an ultrasound device according to the embodiment.
Figure 4:
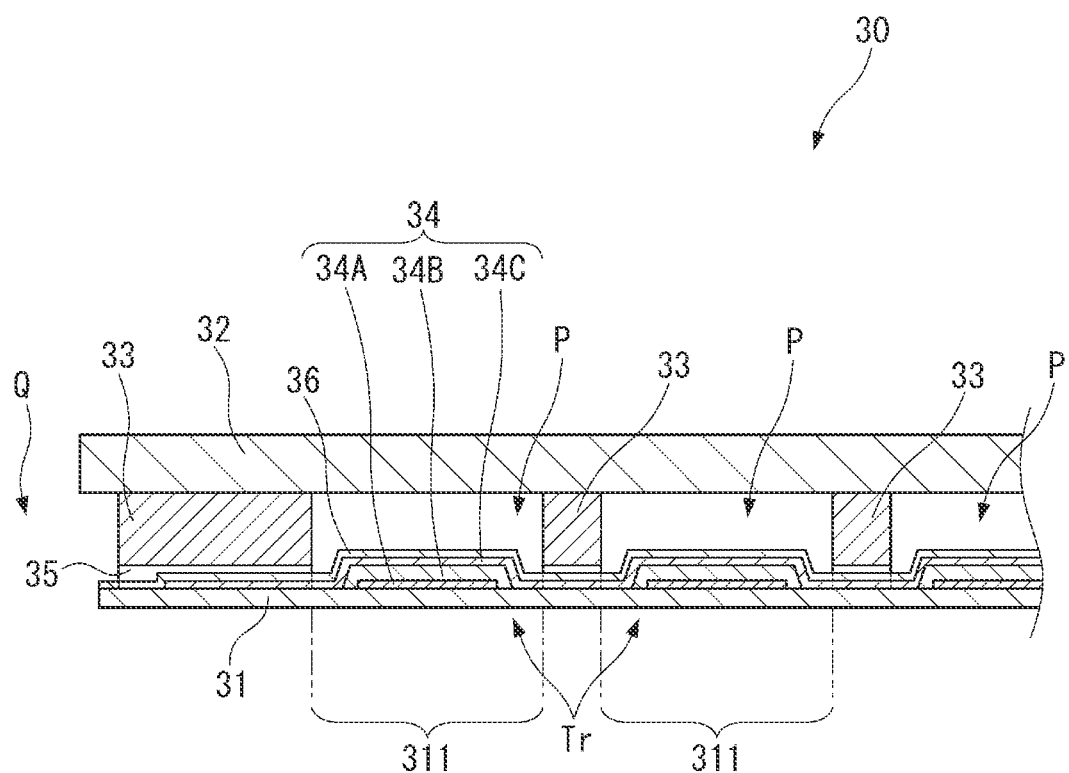
FIG. 4 is a schematic cross-sectional view of the ultrasound device taken along a line B-B in FIG. 3.
Figure 5:
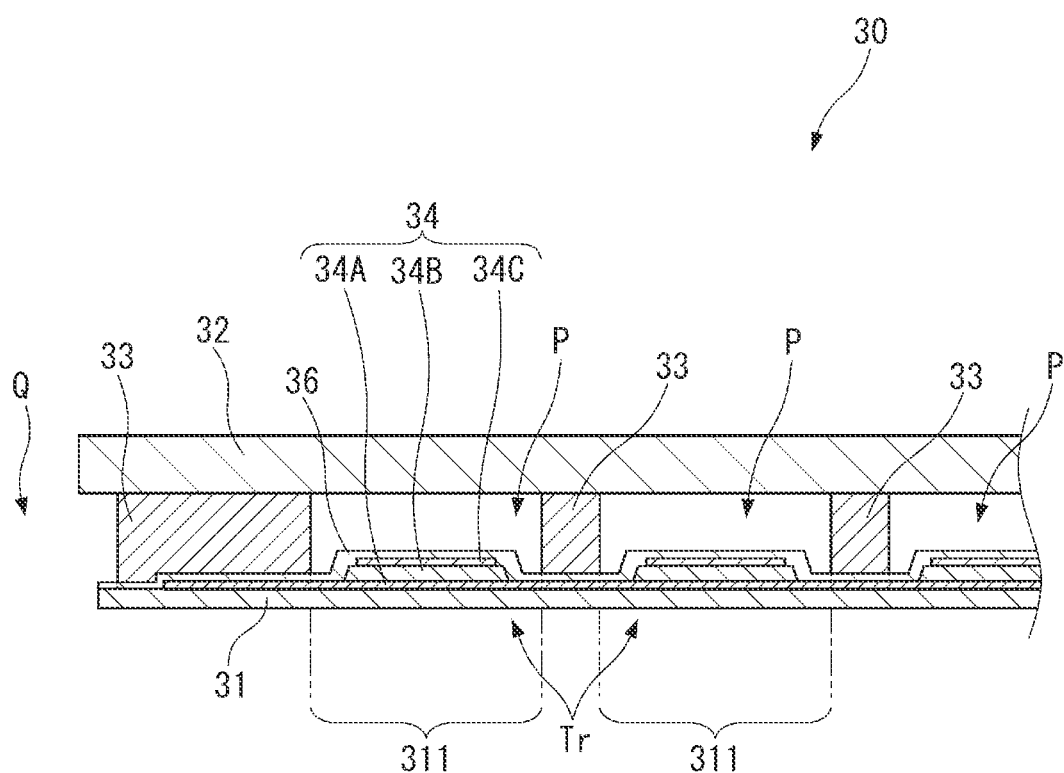
FIG. 5 is a schematic cross-sectional view of the ultrasound device taken along a line C-C in FIG. 3.

FIG. 3 is a plan view showing an example of the ultrasound device 30 according to the embodiment. FIG. 4 is a schematic cross-sectional view of the ultrasound device 30 taken along a line B-B in FIG. 3. FIG. 5 is a schematic cross-sectional view of the ultrasound device 30 taken along a line C-C in FIG. 3. FIG. 3 is a schematic plan view of the ultrasound device 30 when the ultrasound device 30 is viewed from a −Z side, and illustration of a protection plate 32 is omitted.

In the ultrasound device 30, a plurality of ultrasound transducers Tr are disposed in a two-dimensional array shape along an X direction and a Y direction orthogonal to each other. Here, it is assumed that a direction orthogonal to the X direction and the Y direction is a Z direction, and the ultrasound waves are transmitted from the ultrasound device 30 to a +Z side.

As shown in FIGS. 3 to 5, the ultrasound device 30 includes a vibration plate 31, the protection plate 32 facing the vibration plate 31, a joining portion 33 that joins the protection plate 32 to the vibration plate 31, and piezoelectric elements 34 provided at the vibration plate 31.

The vibration plate 31 is made of, for example, a laminate of $SiO_2$ and $ZrO_2$, and transmits the ultrasound waves to the +Z side by being bent by an extension and contraction drive of the piezoelectric element 34. A surface of the vibration plate 31 on the +Z side is a transmission and reception surface 30A for transmitting and receiving the ultrasound waves. Details will be described later, but in the embodiment, the +Z side of the vibration plate 31 faces an opening 21A provided in the case 20, and is exposed from the opening 21A.

The protection plate 32 is made of a material whose thickness in the Z direction is sufficiently larger than that of the vibration plate 31 and that is hardly deformed. The protection plate 32 is joined to a surface of the vibration plate 31 on a −Z side via the joining portion 33.

The joining portion 33 is provided between the vibration plate 31 and the protection plate 32, and joins the vibration plate 31 to the protection plate 32. Further, when viewed from the Z direction, the joining portion 33 is formed in a frame shape that surrounds an outer periphery of the piezoelectric element 34. A portion of the vibration plate 31 joined to the joining portion 33 is a portion where vibration is prevented by being coupled to the protection plate 32. Therefore, the vibration plate 31 constitutes a plurality of vibration portions 311 by being partitioned into a plurality of vibration regions by the joining portion 33, and the piezoelectric element 34 is disposed on a surface of each vibration portion 311 on the −Z side. That is, in the embodiment, a portion of the vibration plate 31 surrounded by the joining portion 33 vibrates, thereby outputting the ultrasound waves.

Here, a space surrounded by the vibration plate 31, the protection plate 32, and the joining portion 33 is an element space P.

As shown in FIGS. 2 and 3, element communication holes 35 (second communication holes of the present disclosure) that communicate the element space P and outside of the element space P to communicate with each other are provided in the joining portion 33.

For example, in the embodiment, as shown in FIG. 3, the element communication holes 35 that cause these element spaces P to communicate with one another are provided in the joining portion 33 between the element spaces P adjacent to each other in the X direction. Further, the element communication hole 35 that communicates the element space P with an internal space Q of the case 20 is provided in the joining portion 33 on the −X side of the element space P disposed at an end portion on the −X side. Similarly, the element communication hole 35 that communicates the element space P with the internal space Q of the case 20 is provided in the joining portion 33 on the +X side of the element space P disposed at an end portion on the +X side. Accordingly, each element space P communicates with the internal space Q of the case 20.

The element communication hole 35 is preferably formed by cutting out a part of a joining position of the joining portion 33 to the protection plate 32. This is because a joining position of the joining portion 33 to the vibration plate 31 is a portion that partitions a region of the vibration portion 311, and when the joining portion 33 of the portion is cut out, a natural frequency of the vibration portion 311 changes, and a frequency of the ultrasound waves output by vibration of the vibration portion 311 fluctuates. On the contrary, as in FIGS. 2 and 4, when the element communication hole 35 is formed by cutting out a part of a joining position of the joining portion 33 to the protection plate 32, the fluctuation in the frequency as described above can be prevented. Further, the joining portion 33 can be formed by forming a resist resin at the vibration plate 31 and patterning the resist resin. At this time, the element communication hole 35 can be easily formed by removing a part of the formed resist resin.

In the embodiment, an example in which the element communication hole 35 is provided at the joining position between the joining portion 33 and the protection plate 32 is shown, but the element communication hole 35 may be provided between the vibration plate 31 and the protection plate 32.

The piezoelectric element 34 is provided on the −Z side of each vibration portion 311 of the vibration plate 31. The piezoelectric element 34 is made of, for example, a laminate obtained by laminating a lower electrode 34A, a piezoelectric film 34B, and an upper electrode 34C from the vibration plate 31 toward the −Z side.

Here, one ultrasound transducer Tr is implemented by the vibration portion 311 and the piezoelectric element 34.

In the ultrasound transducer Tr, when a rectangular-wave voltage (drive signal) having a predetermined frequency is applied between the lower electrode 34A and the upper electrode 34C, the piezoelectric film 34B extends and contracts, the vibration portion 311 vibrates because of the extension and contraction of the piezoelectric film 34B, and the ultrasound waves are sent out to the +Z side. Further, when the vibration portion 311 is vibrated by the ultrasound waves (reflected waves) reflected from the living body, the piezoelectric film 34B is bent, whereby a potential difference is generated between a lower electrode 34A side and an upper electrode 34C side of the piezoelectric film 34B. Accordingly, when the potential difference generated between the lower electrode 34A and the upper electrode 34C is detected, it is possible to detect reception of the ultrasound waves.

In the embodiment, as shown in FIG. 3, the lower electrodes 34A of the ultrasound transducers Tr arranged in the Y direction are coupled to one another. These lower electrodes 34A are coupled to a drive terminal 34D, and are electrically coupled to the control board 40 via, for example, a flexible printed circuit board from the drive terminal 34D.

Further, the upper electrodes 34C of the ultrasound transducers Tr arranged in the X direction are coupled to one another. These upper electrodes 34C are coupled to a common terminal 34E, and are electrically coupled to the control board 40 via, for example, the flexible printed circuit board from the common terminal 34E.

Here, in the embodiment, the ultrasound transducers Tr are simultaneously driven, but the present disclosure is not limited thereto. For example, one channel may be implemented by the ultrasound transducers Tr coupled by the lower electrodes 34A arranged in the Y direction, and drive electrodes corresponding to the channels may be provided such that the channels arranged in the X direction are independently driven. In this case, when the channels are driven with a delay, it is possible to control a transmission direction of the ultrasound waves. Further, each ultrasound transducer Tr may be driven independently.

In the embodiment, a protective film 36 is preferably formed by covering the vibration plate 31 of the ultrasound device 30 and a surface on the −Z side of the piezoelectric element 34 provided at the vibration plate 31. In the embodiment, during use of the ultrasound probe 10, entry of water droplets into the case 20 is prevented by a waterproof mechanism to be described later. On the other hand, details will be described later, and a sterilizing gas enters the case 20 in a sterilizing process of the ultrasound probe 10. The protective film 36 is made of a film having corrosion resistance against the sterilizing gas, and covers the piezoelectric element 34, that is, the lower electrode 34A, the piezoelectric film 34B, and the upper electrode 34C. Accordingly, it is possible to prevent deterioration in the piezoelectric element 34 due to the sterilizing gas.

Configuration of Control Board 40

The control board 40 is housed in the case 20 together with the ultrasound device 30. An arrangement position of the control board 40 is not particularly limited, but the control board 40 is preferably disposed on the −Z side of the ultrasound device 30 in the case 20.

Illustration is omitted, but the control board 40 is provided with various control circuits that control drive of the ultrasound device 30, a battery, a communication circuit, and the like. The protective film 36 used for the vibration plate 31 is also preferably formed at the circuits of the control board 40. The formation of the protective film 36 can prevent damage to a circuit due to hydrogen peroxide.

Configuration of Case 20

As described above, the case 20 houses the ultrasound device 30 and the control board 40. The ultrasound probe 10 according to the embodiment is sterilized by the sterilizing process after the ultrasound diagnostic process is ended. The sterilizing gas is used in the sterilizing process, and a material resistant to the sterilizing gas is used as the case 20. For example, in the embodiment, hydrogen peroxide ($H_2O_2$) is used as the sterilizing gas. In this case, it is preferable to use a thermoplastic polymer such as ethylene-fluorinated ethylene copolymer (ETFE), tetrafluoroethylene-hexafluoropropylene copolymer (FEP), high-density polyethylene (HDPE), high-density polyethylene (LDPE), polycarbonate (PC), glycolic acid polyester (PETG), perfluoroalkoxy fluororesin (PFA), polymethylpentene (PMP), polypropylene (PP), polystyrene (PS), polysulfone (PSF), polyurethane (PUR), polyvinyl chloride (PVC), polyvinylidene fluoride (PVDF), thermoplastic elastomer (TPE), tetrafluoroethylene (TFE), and modified polyphenylene oxide (PPO) for the case 20.

More specifically, as shown in FIGS. 1 and 2, the case 20 includes the front surface portion 21 that faces the living body when the ultrasound probe 10 is fixed to the living body, a side surface portion 22 that is continuous with the front surface portion 21 and intersects the front surface portion 21, and a back surface portion 23 that is continuous with the side surface portion 22 and faces the front surface portion 21.

The ultrasound device 30 and the control board 40 described above are disposed in the internal space Q of the case 20 surrounded by the front surface portion 21, the side surface portion 22, and the back surface portion 23.

The front surface portion 21 is provided with an opening 211. When the ultrasound device 30 is housed in the case 20, the transmission and reception surface 30A of the ultrasound device 30 faces the opening 211. In the embodiment, the transmission and reception surface 30A is exposed to outside of the case 20 from the opening 211. Further, a sealing mechanism that seals a gap between the ultrasound device 30 and the opening 211 is provided in the opening 211 of the case 20. In the embodiment, in order to expose the transmission and reception surface 30A of the ultrasound device 30 to the outside of the case 20, a waterproof sealing material 212 is filled so as to fill a gap between an outer peripheral edge of the vibration plate 31 of the ultrasound device 30 and an edge of the opening 211. Accordingly, the opening 211 is closed by the sealing material 212 and the ultrasound device 30, and entry of the water droplets from the opening 211 is prevented.

The sealing material 212 is more preferably resistant to the sterilizing gas during the sterilizing process.

In the embodiment, a rubber resistant to hydrogen peroxide used as the sterilizing gas is used. More polyethylene, preferably, chlorosulfonated a silicone rubber, a fluoride rubber, an ethylene propylene rubber, a butyl rubber, or the like is used as the sealing material 212. The sealing material 212 formed of such a material is resistant to concentration and a temperature of hydrogen peroxide, and can prevent deterioration due to the sterilizing process. Accordingly, it is possible to maintain sealing effects of the opening 211.

As described above, when the ultrasound probe 10 is fixed to the living body, the probe sheet 50 is stuck to the front surface portion 21. The probe sheet 50 is a sheet including the acoustic lens 51, is stuck to the front surface portion 21 of the case 20, and is a contact surface that comes into contact with the living body. In order to prevent infection, the probe sheet 50 is replaced every time the ultrasound probe 10 is used, and the used probe sheet 50 is discarded.

The case 20 is provided with at least one case communication hole 24 (first communication hole) that communicates the internal space Q with the outside of the case 20.

For example, in the embodiment, the case communication hole 24 is provided in the side surface portion 22 of the case 20. The case communication hole 24 is a hole portion provided to keep pressures in and outside the case 20 the same during the sterilizing process. Therefore, it is preferable to have a waterproof structure except during the sterilizing process.

For example, a porous member 25 is disposed in the case communication hole 24. The porous member 25 may be filled in the case communication hole 24, or may be disposed inside the case 20 (internal space Q) so as to cover the entire case communication hole 24 as shown in FIG. 1.

With the porous member 25, a gas can pass through the case communication hole 24, and a water droplet cannot pass through the case communication hole 24.

Figure 6:
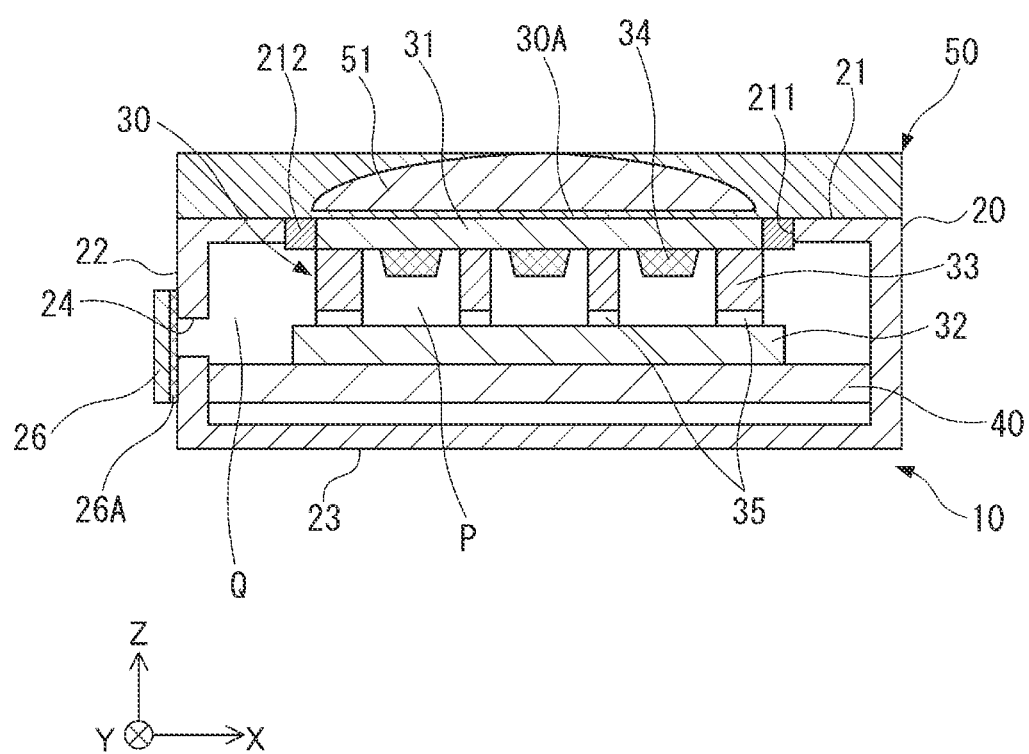
FIG. 6 is a schematic cross-sectional view showing other configuration examples of the ultrasound probe according to the embodiment.

In the example shown in FIGS. 1 and 2, the case communication hole 24 provided in the side surface portion 22 is covered by the porous member 25, but the present disclosure is not limited thereto. FIG. 6 is a schematic cross-sectional view showing another configuration example of the ultrasound probe 10 according to the embodiment. In the example, a lid 26 that opens and closes the case communication hole 24 is provided. Specifically, the lid 26 is stuck to the case communication hole 24 via an adhesive layer 26A. Accordingly, the case communication hole 24 is in a closed state, and entry of the water droplets from the case communication hole 24 into the internal space Q is prevented. On the other hand, in a case where the ultrasound probe 10 is subjected to the sterilizing process, when the lid 26 and the adhesive layer 26A are removed, an open state can be established in which inside and outside of the case 20 communicate with each other, and the pressures in and outside the case 20 can be kept constant.

In the example shown in FIG. 6, the lid 26 is attached and detached, but for example, a lid that can slide with respect to the case 20 may be provided, or a lid may be attached to the case via a hinge mechanism.

In the example in FIG. 6, the lid 26 has a plate shape, and closes the case communication hole 24 by covering the case communication hole 24, but the lid may be a flexible member such as a rubber, and the case communication hole 24 may be closed by pressing the lid into the case communication hole 24.

Sterilizing Process of Ultrasound Probe 10

Next, the sterilizing process of the ultrasound probe 10 as described above will be described.

In the ultrasound diagnosis using the ultrasound probe 10 according to the embodiment, the following procedure will be performed.

(1) Protective gloves (for cleaning, disinfection, and sterilization) for preventing infection are worn by a user.

(2) The probe sheet 50 is mounted on the ultrasound probe 10.

(3) The ultrasound probe 10 is subjected to the sterilizing process.

(4) The protective gloves are discarded.

(5) Protective gloves (for inspection) for preventing infection are worn by the user.

(6) A preparatory process of the ultrasound probe 10 is performed (for example, confirmation of presence or absence of an abnormality of the ultrasound probe 10, and confirmation of coupling to an ultrasound image diagnostic apparatus, and a temperature or image noise of the acoustic lens 51).

(7) A sterilized acoustic gel is applied to the ultrasound probe 10 (probe sheet 50).

(8) The ultrasound probe 10 is fixed to a site on an undamaged body surface (living body).

(9) An ultrasound image diagnosis is performed.

(10) After the ultrasound image diagnosis is ended, the probe sheet 50 is removed from the ultrasound probe 10 and is discarded as infectious waste, and the acoustic gel remaining on the ultrasound probe 10 is wiped off.

(11) The ultrasound probe is cleaned and dried.

(12) The probe sheet 50 is mounted on the ultrasound probe 10.

(13) The ultrasound probe 10 is sterilized.

(14) A shut-down inspection is performed.

The sterilizing process of the ultrasound probe 10 in (3) and (13) is performed by putting the ultrasound probe 10 in a chamber of a sterilizing apparatus including a sterilizing chamber.

In the sterilizing process, for example, a pressure in the chamber is reduced to a vacuum or a substantially vacuum, and hydrogen peroxide is injected into the chamber. The hydrogen peroxide injected into the chamber is vaporized and diffused to become the sterilizing gas, and removes and sterilizes microorganisms and the like that are sterilization targets attached to the ultrasound probe 10. Thereafter, of inside the chamber is depressurized again, and the vaporized hydrogen peroxide is discharged. Clean air that passes through a filter is introduced into the chamber, and the pressure in the chamber is returned.

In the sterilizing process described above, two depressurization processes are performed, but the number of times of depressurization may be further increased depending on a sterilizing apparatus to be used.

Here, as a comparative example, an ultrasound probe including a case in which no case communication hole 24 is provided is exemplified. Generally, in order to prevent the acoustic gel, a biological liquid (blood or the like), and a cleaning liquid during cleaning from entering the case, an ultrasound probe mounted on the living body is subjected to a waterproof process, and airtightness thereof is fairly high. Therefore, when the ultrasound probe in the comparative example is put into a sterilizing chamber and is depressurized, the vibration plate may be damaged due to a pressure difference between inside and outside of the case.

On the contrary, in the embodiment, even when the ultrasound probe is put into the sterilizing chamber and is depressurized by providing the case communication hole 24, a pressure outside the case 20 and a pressure in the internal space Q are the same. Further, since the element spaces P and the internal space Q communicate with each other via the element communication holes 35, a pressure in each element space P and an external pressure of the case 20 are the same.

Therefore, in the embodiment, a stress on the vibration plate 31 due to a pressure difference between the outside of the case 20 and the element space P does not act, and damage to the vibration plate 31 can be prevented.

In the embodiment, the sterilizing gas made of hydrogen peroxide enters the internal space Q and the element spaces P, but since the −Z side of the vibration plate 31 is covered by the protective film 36 resistant to hydrogen peroxide, deterioration in the piezoelectric element 34 can be prevented.

Effects of Embodiment

The ultrasound probe 10 according to the embodiment includes the ultrasound device 30 that transmits and receives the ultrasound waves, and the case 20 that houses the ultrasound device 30. The ultrasound device 30 includes the vibration plate 31, and the piezoelectric elements 34 disposed at the vibration plate 31. The case 20 is provided with the opening 211 facing the vibration plate 31, and the case communication hole 24 that is provided at a position different from that of the opening 211 and that communicates the internal space Q of the case 20 with the outside of the case. Further, the case 20 includes the sealing mechanism that prevents the entry of the water droplets from the opening 211 into the internal space, that is, the sealing material 212 that fills the gap between the edge of the opening 211 and the ultrasound device 30.

In the embodiment, even when the ultrasound probe 10 is put into the sterilizing chamber for the sterilizing process and the chamber is depressurized, it is possible to prevent an inconvenience that the pressure difference is generated between the inside and the outside of the case 20. Therefore, it is possible to prevent damage to the ultrasound device 30 due to the pressure difference.

Since the opening 211 of the case 20 facing the ultrasound device 30 is sealed by the sealing material 212, it is also possible to prevent an inconvenience that the water droplets enter inside of the case 20 from the opening 211 during use of the ultrasound probe 10.

In the embodiment, the ultrasound device 30 includes the protection plate 32 disposed on the −Z side of the vibration plate 31, and the joining portion 33 that joins the protection plate 32 to the vibration plate 31. The element space P surrounded by the vibration plate 31, the protection plate 32, and the joining portion 33 is defined. The joining portion 33 is provided with the element communication hole 35 that communicates the element spaces P with the internal space Q.

Accordingly, even when the ultrasound probe 10 is placed in a depressurized environment, the pressure outside the case, the pressure in the internal space Q, and the pressure in each element space P can be made the same, and damage to the vibration plate 31 can be prevented.

In the embodiment, in the case 20, the porous member 25 is disposed at the position where the case communication hole 24 is closed.

The porous member 25 is provided in the case communication hole 24, whereby a gas can pass through the case communication hole 24 during the sterilizing process (during depressurization) of the ultrasound probe 10, and damage to the ultrasound device 30 due to the pressure difference can be prevented as described above. Further, since the porous member 25 can prevent a liquid or a solid from entering, it is possible to prevent entry of the water droplets into the case 20.

In the embodiment, the case 20 may include the lid 26 that can switch between the open state where the case communication hole 24 is opened to communicate the internal space Q with the outside of the case 20, and the closed state where the case communication hole 24 is closed.

Also in this case, when the case communication hole 24 is set in the open state by the lid 26, a gas can pass through the case communication hole 24 during the sterilizing process (during depressurization) of the ultrasound probe 10, and damage to the ultrasound device 30 due to the pressure difference can be prevented as described above. Further, when the case communication hole 24 is set in the closed state, it is possible to prevent entry of the water droplets into the case 20.

In the embodiment, the case 20 is preferably formed of a thermoplastic polymer.

Since the case 20 is formed of the thermoplastic polymer, even when the ultrasound probe 10 is exposed to the sterilizing gas such as hydrogen peroxide, the case 20 cannot be eroded by the sterilizing gas, and the ultrasound probe 10 can be appropriately subjected to the sterilizing process.

MODIFICATIONS

The present disclosure is not limited to the embodiments and modifications described above.

Modifications, improvements, and configurations obtained by appropriately combining the embodiments within a scope in which an object of the present disclosure can be achieved are included in the present disclosure.

Modification 1

In the embodiment described above, the configuration is exemplified in which the element communication holes 35 are provided in the joining portion 33 on the −X side of the element space P at the end portion on the −X side, and the joining portion 33 on the +X side of the element space P at the end portion on the +X side. On the contrary, the element communication hole may be formed in any shape as long as the element spaces P communicate with the internal space Q of the case 20.

For example, the element communication hole 35 that communicates with the internal space Q may be provided in the joining portion 33 on the −X side of the element space P at the end portion on the −X side, and the element communication hole 35 may not be provided in the joining portion 33 on the +X side of the element space P at the end portion on the +X side.

The element spaces P arranged in the X direction are caused to communicate by the element communication holes 35, but the element spaces P arranged in the Y direction may be caused to communicate by the element communication holes 35, and the element spaces P arranged in the X direction and the Y direction may be caused to communicate by the element communication holes 35.

When the element spaces P arranged in the X direction and the Y direction are caused to communicate with each other by the element communication holes 35, the number of communication holes that communicate the element spaces P with the internal space Q can be reduced.

Modification 2

In the embodiment described above, the element communication hole 35 is provided in the joining portion 33, but the present disclosure is not limited thereto. For example, element communication holes that run in a thickness direction of the protection plate 32 may be formed at positions of the protection plate 32 that face the element spaces P. In this case, since no hole is formed in the joining portion 33, it is possible to prevent a decrease in joining strength.

Pipe members that communicate the element spaces P with the internal space Q may be embedded inside the protection plate 32.

Modification 3

In the embodiment described above, the probe sheet 50 including the acoustic lens 51 is stuck to the ultrasound probe 10 and is fixed to the living body. On the contrary, the acoustic lens may be fixed to the ultrasound probe.

Figure 7:
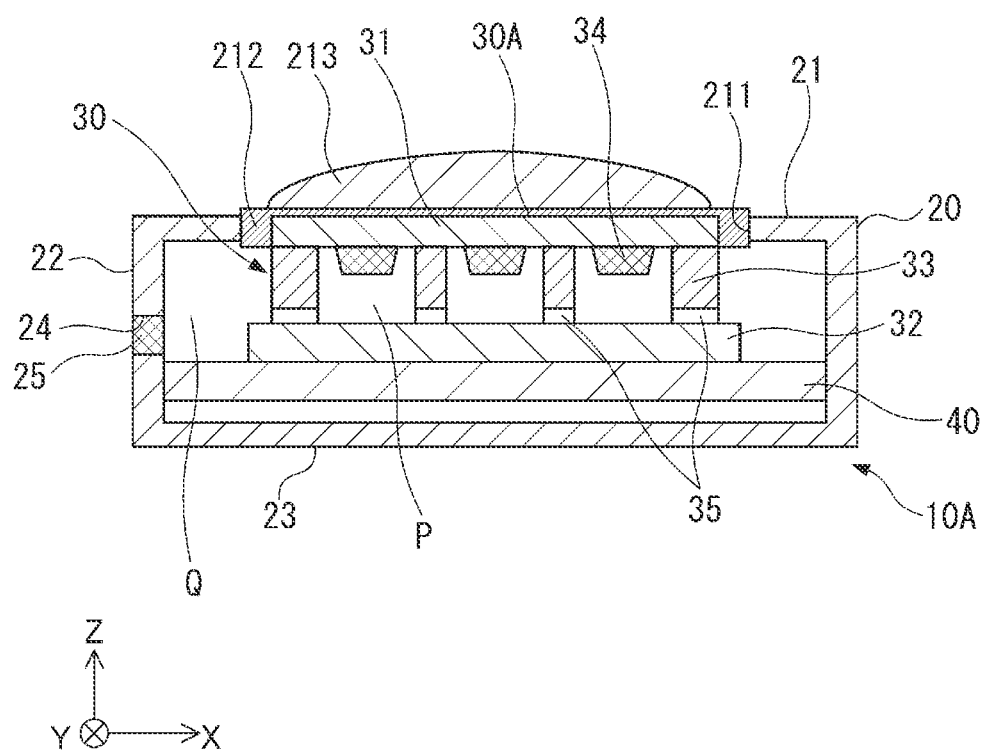
FIG. 7 is a cross-sectional view showing a schematic configuration of an ultrasound probe according to Modification 3.

FIG. 7 is a cross-sectional view showing a schematic configuration of an ultrasound probe 10A according to Modification 3.

In the ultrasound probe 10A shown in FIG. 7, an acoustic lens 213 is provided in the opening 211 of the case 20, and the sealing material 212 is filled so as to fill a gap between the acoustic lens 213 and the edge of the opening 211. That is, a sealing mechanism that closes the opening 211 is implemented by the sealing material 212 and the acoustic lens 213.

In a case of the configuration, for example, a gap between the ultrasound device 30 and the acoustic lens 213 is preferably filled with a material having an acoustic impedance close to that of the acoustic lens 213 so that no air layer is interposed between the acoustic lens 213 and the ultrasound device 30. When a silicone resin or the like having an acoustic impedance close to that of the living body is used as the sealing material 212, the gap between the acoustic lens 213 and the ultrasound device 30 can also be filled with the sealing material 212 as shown in FIG. 7.

Modification 4

In the embodiment described above, an example is shown in which the vibration portions 311 are implemented by the vibration plate 31 being partitioned into the plurality of regions by the joining portion 33, but the present disclosure is not limited thereto.

Figure 8:
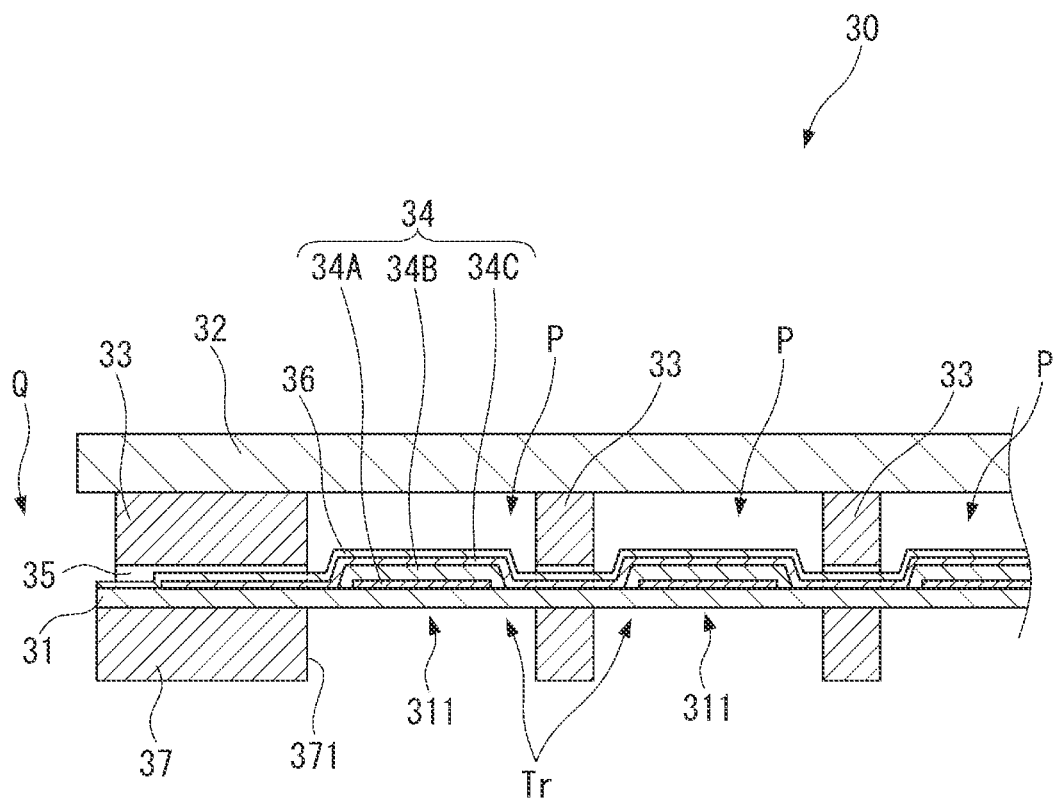
FIG. 8 shows a schematic configuration of an ultrasound device according to Modification 4.

FIG. 8 shows a schematic configuration of the ultrasound device 30 according to Modification 4.

In the ultrasound device 30 shown in FIG. 8, an element substrate 37 is provided on the +Z side of the vibration plate 31, and a plurality of through holes 371 are formed in an array shape in the element substrate 37. The vibration plate 31 is disposed on the −Z side of the element substrate 37 so as to cover the through holes 371.

In such a configuration, portions overlapping the through holes 371 of the vibration plate 31 constitute the vibration portions 311. In the configuration, it is unnecessary to partition the vibration portions 311 by the joining portion 33, and the protection plate 32 and the vibration plate 31 may be joined only outside the array region where the vibration portions 311 are disposed.

Alternatively, the through hole 371 may be elongated in the X direction, and the plurality of through holes 371 may be disposed along the Y direction. In this case, a plurality of joining portions 33 elongated in the Y direction are formed along the X direction. Accordingly, each vibration portion 311 can be implemented by an edge of the through hole 371 and the joining portion 33.

Modification 5

In the embodiment described above, the case communication hole 24 that is the first communication hole is provided in the side surface portion 22 of the case 20, but the present disclosure is not limited thereto.

For example, in the front surface portion 21 of the case 20, the case communication hole 24 may be provided at a position different from that of the opening 211. Alternatively, the case communication hole 24 may be provided in the back surface portion 23.

In FIG. 1, one case communication hole 24 is exemplified, but a plurality of case communication holes 24 may be provided.

SUMMARY OF PRESENT DISCLOSURE

An ultrasound probe according to an aspect of the present disclosure includes: an ultrasound device configured to perform at least one of transmission and reception of an ultrasound wave; and a case housing the ultrasound device. The ultrasound device includes a vibration plate and a piezoelectric element disposed at the vibration plate. The case is provided with an opening facing the vibration plate, and a first communication hole that is provided at a position different from that of the opening and that communicates an internal space of the case with outside of the case. The case includes a sealing mechanism configured to prevent entry of a water droplet from the opening into the internal space.

In such an ultrasound probe, even when the ultrasound probe is put into a chamber for a sterilizing process and the chamber is depressurized, it is possible to prevent an inconvenience that a pressure difference is generated between inside and outside of the case. Therefore, it is possible to prevent damage to the ultrasound device due to the pressure difference. Further, since the sealing mechanism is provided in the opening of the case facing the ultrasound device, it is also possible to prevent an inconvenience that the water droplet enters the inside of the case from the opening during use of the ultrasound probe.

In the ultrasound probe according to this aspect, the ultrasound device may further include a protection plate facing a side of the vibration plate at which the piezoelectric element is disposed, and a joining portion that joins the protection plate to the vibration plate, an element space surrounded by the vibration plate, the protection plate, and the joining portion may be defined, and a second communication hole that communicates the element space with the internal space of the case may be provided in at least any one of the protection plate and the joining portion.

The ultrasound device may have a configuration in which the vibration plate and the protection plate are joined by the joining portion, and the joining portion defines the vibration portion that vibrates in the vibration plate. In such a case, the element space surrounded by the vibration plate, the protection plate, and the joining portion becomes a sealed space. When the ultrasound probe is exposed to a depressurized environment, the vibration plate may be damaged due to a pressure difference between the element space and outside of the case. On the contrary, in this aspect, the second communication hole that communicates the element space with the internal space of the case is provided. Accordingly, even when the ultrasound probe is placed in a depressurized environment, a pressure outside the case, a pressure in the internal space, and a pressure in each element space can be made the same, and damage to the vibration plate can be prevented.

In the ultrasound probe according to this aspect, the case may include a porous member disposed at a position where the first communication hole is closed.

Since the first communication hole is provided in the case, when the ultrasound probe is placed in a depressurized environment, a pressure difference between the internal space of the case and the outside of the case can be eliminated, and damage to the ultrasound probe can be prevented as described above. On the other hand, when ultrasound diagnosis is performed using the ultrasound probe, a liquid such as acoustic gel, a biological liquid, or a cleaning liquid may enter the inside of the case from the first communication hole. In this case, the piezoelectric element or the like of the ultrasound device may be damaged due to a water droplet that enters.

On the contrary, in this aspect, the porous member is provided in the first communication hole. Since the porous member can prevent entry of a liquid and a solid while allowing a gas to pass therethrough, it is possible to prevent entry of the water droplet into the case.

In the ultrasound probe according to this aspect, the case may include a lid configured to switch between an open state where the first communication hole is opened and the internal space and the outside of the case are caused to communicate with each other, and a closed state where the first communication hole is closed.

In this aspect, the open and closed state can be switched by the lid. In the open state, the pressure difference between the inside and the outside of the case can be eliminated by allowing a gas to pass into or out of the case. As described above, when the ultrasound probe is placed under a reduced pressure, it is possible to prevent damage to the ultrasound device due to the pressure difference. On the other hand, in the closed state, entry of a water droplet into the case can be prevented, and damage to the piezoelectric element and the like due to the water droplet can be prevented.

In the ultrasound probe according to this aspect, the case may be formed of a thermoplastic polymer.

Since the case is formed of the thermoplastic polymer, even when the ultrasound probe is exposed to a sterilizing gas such as hydrogen peroxide, the case cannot be eroded by the sterilizing gas, and the ultrasound probe can be appropriately subjected to the sterilizing process.

What is claimed is:

1. An ultrasound probe comprising:
an ultrasound device configured to perform at least one of transmission and reception of an ultrasound wave; and
a case housing the ultrasound device, the case having a front surface, a side surface intersecting the front surface, and a back surface intersecting the side surface and facing the front surface, wherein
the ultrasound device includes:
  a vibration plate; and
  a piezoelectric element disposed at the vibration plate,
the case is provided with:
  an opening in the front surface, and the opening faces the vibration plate; and
  a first communication hole that is provided in the side surface and is configured to communicate an internal space of the case with an outside of the case, and
the case includes a sealing material configured to prevent entry of a water droplet from the opening into the internal space.

2. The ultrasound probe according to claim 1, wherein the ultrasound device further includes a protection plate facing a side of the vibration plate at which the piezoelectric element is disposed, and a joining portion configured to join the protection plate to the vibration plate,
an element space surrounded by the vibration plate, the protection plate, and the joining portion is defined, and
a second communication hole configured to communicate the element space with the internal space of the case is provided in at least one of the protection plate and the joining portion.

3. The ultrasound probe according to claim 1, wherein the case includes a porous member disposed at a position where the first communication hole is closed.

4. The ultrasound probe according to claim 1, wherein the case includes a lid configured to switch between an open state where the first communication hole is opened, and a closed state where the first communication hole is closed.

5. The ultrasound probe according to claim 1, wherein the case is formed of a thermoplastic polymer.

6. The ultrasound probe according to claim 1, wherein the sealing material is provided between an outer peripheral edge of the vibration plate and an edge of the opening.

* * * * *